Nov. 5, 1935.   H. L. JOHNSTON ET AL   2,019,911
FOOD HANDLING APPARATUS
Original Filed May 14, 1928   3 Sheets-Sheet 2

INVENTORS
Herbert L. Johnston
BY David A. Meeker
Maréchal & Noe
ATTORNEYS

Nov. 5, 1935.  H. L. JOHNSTON ET AL  2,019,911
FOOD HANDLING APPARATUS
Original Filed May 14, 1928    3 Sheets-Sheet 3

INVENTORS
Herbert L. Johnston
BY David A. Meeker
Maréchal & Noe
ATTORNEYS

Patented Nov. 5, 1935

2,019,911

UNITED STATES PATENT OFFICE 2,019,911

FOOD HANDLING APPARATUS

Herbert L. Johnston and David A. Meeker, Troy, Ohio, assignors to The KitchenAid Manufacturing Company, Troy, Ohio, a corporation of Ohio Original application May 14, 1928, Serial No. 277,616. Divided and this application February 7, 1931, Serial No. 514,150

4 Claims. (Cl. 259—102)

This invention relates to apparatus for handling or mixing foodstuffs or other material.

One object of the invention is the provision of an apparatus of this character having an electric motor for driving the same, and embodying change-speed and speed-reducing gearing compactly arranged to provide a compact machine of small size and dimensions.

Other objects and advantages of the invention will be apparent from the following description and from the accompanying drawings in which—

This is a division of the application of Herbert L. Johnston and David A. Meeker, Serial No. 277,616, filed May 14, 1928.

Figure 1:
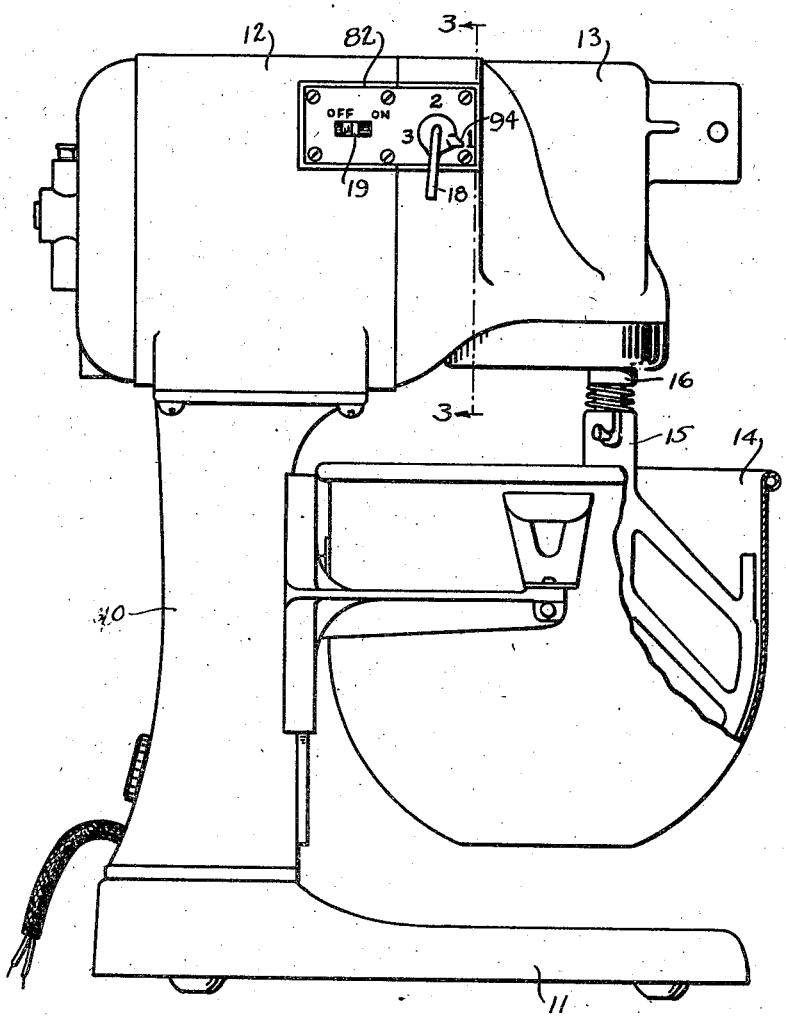
Fig. 1 is a side elevation of a mixing machine embodying the present invention.

Referring more particularly to the drawings Fig. 1 shows a mixing machine adapted for stirring, beating, mixing or otherwise handling foodstuffs, dough or other material, the machine shown being of the type especially adapted to be used in the household. As shown, the machine comprises an upright standard 10 supported by the base 11 and in turn supporting an electric motor 12, a gear-changing and speed-reducing housing 13 and a mixing bowl 14. The gear housing 13 is approximately coextensive in its lateral and vertical dimensions with the motor housing to which it is attached and by which it is supported. The mixing bowl cooperates with a beater arm 15 which is operated from a shaft 16 driven from the motor through the gear-changing device mentioned. A control handle 18 is adapted to be manually operated to select the proper speed for suitable operation of the beater arm 15, and an electric control switch 19 is provided to control the starting and stopping of the motor 12.

Figure 2:
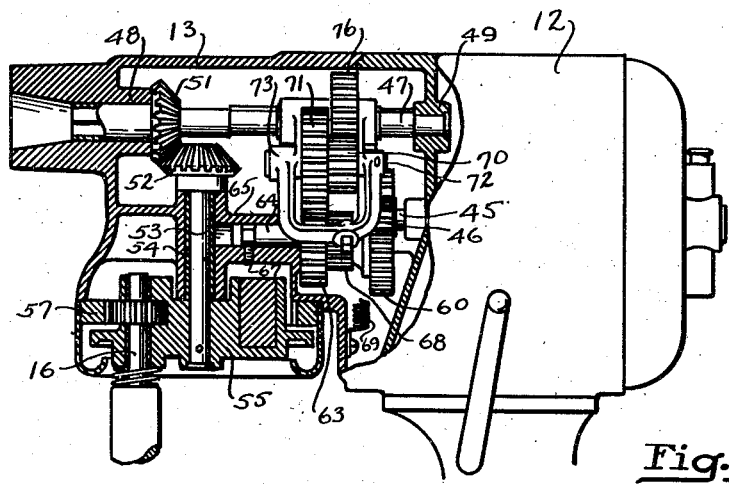
Fig. 2 is a partial view of the reverse side of the machine, partly in vertical section.
Figure 3:
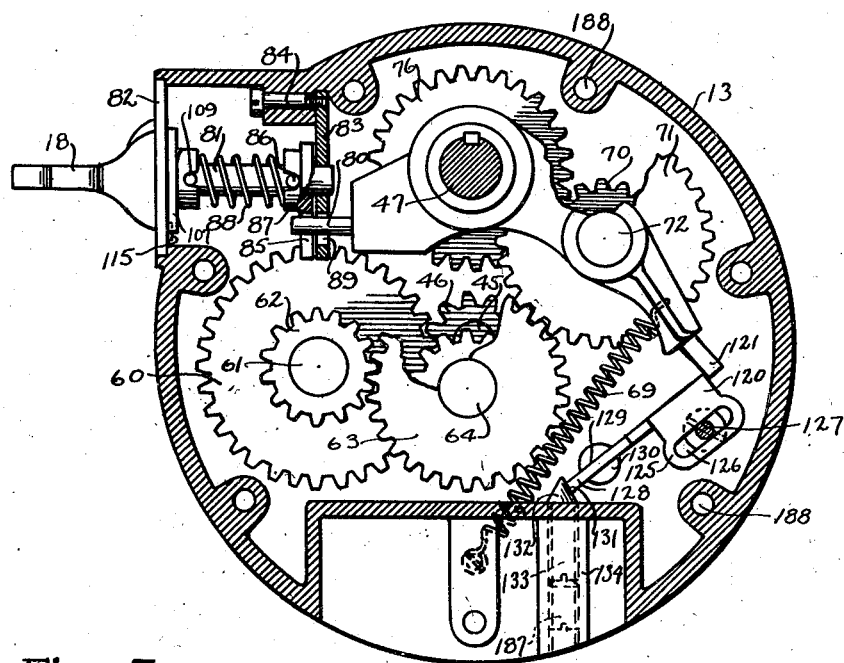
Fig. 3 is a vertical section on the line 3—3 of Fig. 1.
Figure 4:
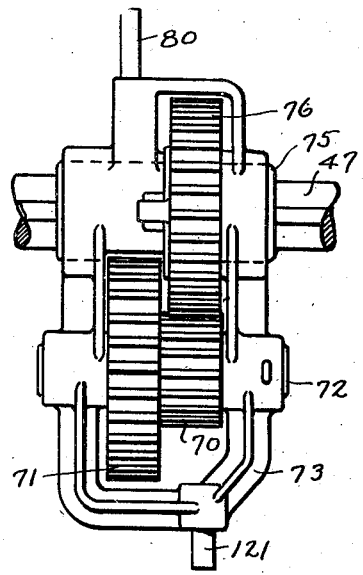
Fig. 4 is a detail of the shifting frame and gear arrangement.

Referring more particularly to Figs. 2 to 4, the motor 12 has a motor shaft 45 on the end of which is a pinion 46. This pinion is adapted to cause the rotation of a driven shaft 47 in the upper portion of the gear casing 13 at high, low or intermediate speeds dependent upon the character of material being treated by the arm 15 in the bowl. The shaft 47 is journaled at its ends in bearings 48 and 49 provided in the gear housing 13. Adjacent the bearing 48 the driven shaft carries a bevel gear 51 which meshes with gear 52 carried on a vertical shaft 53 which is below the shaft 47 and in the same vertical plane. The shaft 53 is rotatably mounted in the long fixed bearing 54 and the lower end of the shaft is pinned to a rotatable assembly or planetary head 55. The shaft 16 is rotatably mounted in the assembly 55 at a point spaced from the axis of the shaft 53, and is provided with a driving pinion 56 which meshes with an internal gear 57 carried by the housing. The shaft 16 is thus rotated about its own axis while it is being moved about the axis of the shaft 53 to efficiently mix and stir the material in the bowl. Shaft 47 as shown, is journaled in the end of casing 13 adjacent the top of the casing and the end of this shaft is suitably socketed to provide a coupling or clutch member cooperating with the internally tapered coupling hub around it to provide an attachment drive for auxiliary apparatus.

The motor pinion 46 engages constantly with the gear 60 rotatable on a counter-shaft 61 mounted at one side of the motor shaft in the housing and which also carries a pinion gear 62 fixed to gear 60 and engaging gear 63 on a short shaft 64. The gear 62 is not shown in Fig. 2 as it lies behind the gear 63 but the construction will be apparent from Fig. 3. The shaft 64 on the free end of which the gear 63 is rotatably journaled is fixed at one end in a stationary bearing 65 by means of a retaining screw or stud 67. This shaft 64 also carries a pinion 68 journaled on the end of the shaft adjacent the gear 63. These gears 63 and 68 are adapted to be selectively engaged by gears 70 and 71 which are rigidly interconnected for simultaneous rotation and which are rotatably mounted on a shaft 72 supported in an adjustable frame or yoke 73. This frame or yoke is rotatably adjustable about the axis of the shaft 47, which is parallel to and spaced from the shaft 72. The frame is also adapted to be shifted longitudinally of the shaft 47 from its intermediate position as shown in Fig. 2. The frame carries a driven gear 76 which is keyed to a sleeve 75 which in turn is keyed to but axially shiftable on the shaft 47, gear 76 being constantly in mesh with the small gear 70 carried by the frame.

When the adjustable frame 73 is in the position shown in Fig. 2 the motor pinion 46 drives the connected gears 63 and 68 through the speed-reducing train of gears 60, 62 and 63. Gear 63 at this time engages gear 71 and thus through the small gear 70 causes a rotation of the gear 76 and the shaft 47. The frame 73 may be moved to the left and simultaneously move about the axis of the shaft 47 in a direction separating the gears to disengage the gears 63 and 71. After the frame 73 has been moved laterally a distance slightly exceeding the width of the gear 71 it may then be rocked about the axis of the shaft 47 to cause the small gear 70 to engage the large gear 63, thus providing for high-speed operation of the shaft 47. From this position the adjusting frame 73 may be moved about the axis of the shaft 47 to first disengage gears 70 and 63 and then move the axes of the gears 63 and 71 sufficiently apart so that these gears will not clash when moved past one another. The frame may then be moved to the right back to the position indicated in Fig. 2. From this position it may be moved still further to the right to cause a low-speed operation of the beater arm, and when so moved to the right and then rocked about the axis of the shaft 47 the pinion 68 will be engaged by the large gear 71 carried by the frame and the shaft 47 will thus be driven at a comparatively slow speed from the motor. When the gear-supporting frame is moved from the slow-speed position it is first necessary to move it about the axis of the shaft 47 until the two large gears 63 and 71 are relatively displaced far enough to permit the lateral movements of the frame 73 without causing these two gears to clash. By reason of a gearing construction as just described it is possible to enclose the gears in a box or housing of minimum size supplied with suitable lubricant for the operating parts, while still obtaining sufficient reduction in speed at the beater arm and sufficient range of speed variation.

It will now be apparent that the construction just described provides a very compact arrangement of the pedestal or standard, the motor, and the gear-changing and speed-reducing gearing, so that a compact apparatus of small dimensions and minimum height is attained. The gear casing 13 is provided on the forward side of the motor housing 12, these two parts being connected by suitable attaching bolts which pass through the attaching holes 188 apparent in Fig. 3. The electric motor is mounted directly above and on the top of the pedestal or standard, with its axis of rotation extending horizontally toward the front of the machine so that the power may be directly supplied to the gear-changing and speed-reducing mechanism. The arrangement of the power transmission in the gear casing is particularly advantageous since it is quite compact and permits the various gears and shafts to be contained and lubricated in a small housing which is substantially coextensive in height and width with the dimensions of the motor housing, and which is preferably formed as a continuation of the end of the motor housing. It will be noted that the power is taken off laterally from the motor pinion 46 through speed-reducing mechanism, and the power is then transferred from a comparatively low point of the casing, through the tumbler or speed-varying gears, to a driven shaft 47 which extends towards the front of the machine parallel with and above the motor axis and which is provided at an upper part of the gear casing. The tumbler or shifting gears 70 and 71 carried by the shifting frame are provided on the opposite side of the vertical center of the gear casing, away from the speed-reducing gears 60 and 62 to utilize substantially all of the available space in the gear casing in a compact manner. The driven shaft 47 is journaled at its end in the outer side of the gear casing to provide a power take-off at this convenient point of the apparatus adapted to be clutched or connected to any suitable auxiliary apparatus to be driven such as a meat chopper or coffee grinder or the like, which may be used in conjunction with the mixing machine. This arrangement provides the attachment hub at a convenient height and readily accessible location, when the machine is used as a bench machine or mounted upon a table, in which the attachment coupling is positioned in alignment with the motor and operable through the change-speed gearing so as to obtain the benefit of various speeds for the attachment coupling as well as the mixer shaft. The arrangement is such that a single bearing serves as a bearing for the driving member 48 of the attachment coupling and as a bearing for one end of the shaft 47. Below the driven shaft 47 and in the same plane therewith the short vertical shaft 43 which drives the beater arm is so arranged that a sufficiently long bearing is provided to take care of the forces involved, the arrangement also being such that this shaft 53 is provided compactly within the gear box where it may be well lubricated. As stated, the gear casing 13 is generally commensurate in size and coextensive with the end of the motor housing and extends in smooth and unbroken relationship therefrom. The lower portion of the gear casing 13 beyond the motor attaching part extends upwardly somewhat above the lower portion of the motor housing providing a pocket within which the planetary head 55 is mounted, so that this head is likewise positioned within the confines of the imaginary cylindrical solid produced by laterally extending the motor housing. This further contributes to the compactness and attractiveness of the machine, while minimizing danger of injury to the planetary head which would be inherent in a machine in which this portion projects outwardly away from the gear casing and related parts.

The gear-supporting frame 73 is moved bodily and is rotated about the axis of the shaft 47 by means of a pin 80 which is operated from the rotatable control member 18 in the following manner: The control member 18 has a single freedom of motion, the construction shown providing for rotational movements of the lever about the axis of a shaft 81 with which it is rigidly connected, and which is rotatably journaled in the mounting plate 82 and in a fixed cam plate 83, which is mounted parallel to the plate 82 by means of the bolts 84. A rotatable cam plate 85 is fixed against rotation on the shaft 81 by means of a pin 86, which engages a pin slot 87 on the hub portion of this plate, and a spring 88 engages this hub portion to normally maintain the two cam plates adjacent one another. The fixed cam plate 83 is provided with a cam slot 89 having vertical portions 90 and 91 shaped to receive the operating pin 80 on the gear frame 73, and having cam surfaces 92 and 93 along which the operating pin 80 rides from the central position shown in Fig. 7 (corresponding to the intermediate speed-gear arrangement). When the control handle 18 is so adjusted that the index point 94 is adjacent position 2, see Fig. 1, the parts will be in the position indicated in Figs. 2 and 5 to 7 inclusive, corresponding to the intermediate-speed positioning. A clockwise rotation of the control handle 18 from this position will cause the operating pin 80 to be moved along the cam surface 92 to lower the pin 80 and thus raise the frame and at the same time shift the gear frame 73 laterally to disengage the gears 71 and 63, this motion of the pin 80 being caused by the movable cam plate 85 which as shown, is provided with camming surfaces 95 and 96. The weight of the gears 70 and 71 and of the main portion of the yoke or frame 73 is overcome by the pressure exerted on the pin 80 by the surface 95 or 96, moving it along the surface 92 of the fixed cam plate 83, so that the gear 71 is drawn away from the gear 63 by the time the pin 80 enters the lower end of slot 90 in the fixed cam plate. A spring 69 may be provided to assist in bringing the gears into engagement by lowering the frame, especially where thick oil is to be used in the gear box which might prevent rapid downward movements of the frame. Upon the completion of the rotary movement of the control lever 18 in bringing the pointer 94 opposite position 3 the weight of the gears 70 and 71 and of the frame 73 causes the pin 80 to rise in the slot 90, this motion being assisted, if need be, by the outer portion of the cam surface 96 of the movable cam plate. This motion of the pin is effective in lowering the gear 70 into engagement with the gear 63 for high-speed operation of the beater arm, it being understood that the lateral motion of the pin 80 from its intermediate position to the cam slot 90 has shifted the movable gear assembly along the axis of the shaft 47. Clockwise rotation of the control lever 18 from this high-speed positioning causes the cam surface 95 of the movable cam plate to first lower the pin 80 and raises the gear 70 out of engagement with the gear 63, the weight of the gear assembly assisted by the action of spring 69 then causing the pin 80 to rise as it is moved toward the intermediate position shown in Fig. 7. It will be apparent that movement of the control lever 18 to a position, as shown in Fig. 1, corresponding to low-speed operation, moves the pin 80 downwardly and laterally and then upwardly in the cam slot 91 to bring the gears to the position where the shaft 47 is rotated at comparatively slow speeds by the motor. The gear ratio is thus changed in a very quick and easy manner by merely rotating the control handle to the desired position for the proper operating speed of the beater.

In the construction of the mechanism by which the gear-shifting frame is moved the cam plate 83 cooperates with the cam pin 80 of the gear-shifting frame to lower the gears 70 or 71 as the case may be into the proximity of the gears 63 and 68 and permit full meshing engagement of the selected gear. In case the peripheral tooth surfaces of the two gears about to mesh come into contact thus temporarily preventing full meshing engagement, as soon as the motor starts and gears 68 and 63 make even a very small rotational movement the proper meshing occurs. The full meshing of engaging gears is completed automatically without further operation on the part of the attendant, the comparatively small angular movement of the frame 73 to bring one of the gears of the gear tumbler into full meshing engagement with the gear that drives it being without effect upon the control handle 18 due to the provision of sufficient lost motion in the mechanical connection between these parts.

Figures 5, 6, 7:
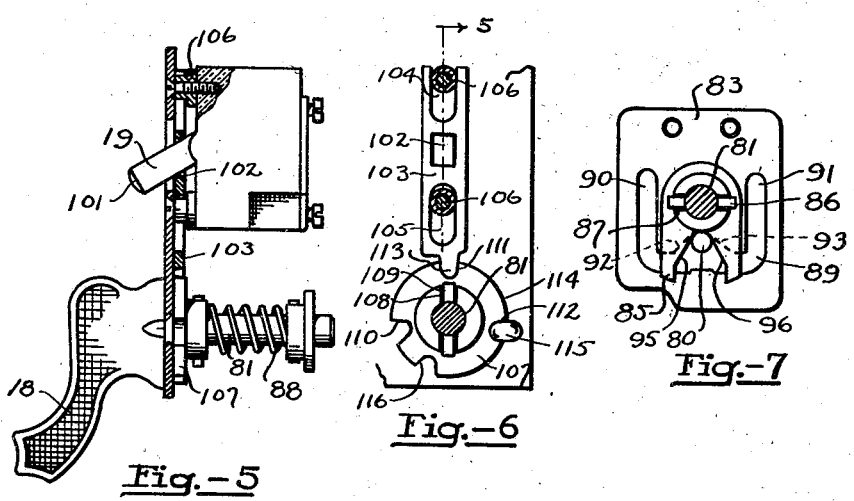
Fig. 5 is a horizontal section through the control switch and interlock on the line 5—5 of Fig. 6.
Fig. 6 is a rear elevation of the control switch and interlock.
Fig. 7 is a detail of the stationary and the rotatable cam plates.

The motor is started and stopped by means of the motor-control switch 19 having a switch handle 101, the latter being shown in motor-energizing position in Fig. 5. This switch means 101 may be moved horizontally to an off position shown in Fig. 1 to stop the rotation of the motor. The motor-control switch is mounted by suitable bolts on the mounting plate 82 alongside the control handle 18, and an interlock is provided between the motor switch and the speed-changing lever 18 to prevent operation of the motor-control switch to "on" position unless the control lever 18 is in one of the three positions corresponding to positions of the movable gear frame where the gear 70 or the gear 71 is in proper mesh with the gear 63 or the gear 68. The interlock is also arranged to prevent the control lever 18 from being operated when the motor is running so that the gear train will not be thrown out of mesh when power is applied to the beater arm. As shown in Figs. 5 and 6 the switch means 101 extends through an opening 102 in an interlock plate 103 which is slotted at 104 and 105 to receive the bushings 106 mounted on the supporting plate 82, and which thus guide the interlock plate 103 for reciprocatory movement toward and away from the shaft 81. The shaft 81 carries a notched plate 107 which is suitably grooved as shown at 108 to receive a pin 109 extending through the shaft so that the notched plate 107 rotates with the shaft. The spring 88 which presses against the movable cam plate 85 also presses against the hub portion of the notched plate as shown to maintain it against the mounting plate 82. The plate 107 is provided with three notches 110, 111 and 112 adapted to receive a rounded tongue 113 provided on the end of the interlock plate 103. The notch 110 will be in position to be engaged by the tongue 113 of the interlock plate when the lever 18 extends upwardly and the pointer 94 is adjacent position 3 corresponding to high-speed operation, and the notches 111 and 112 will be in position to be engaged by the tongue 113 at intermediate and low-speed settings respectively. When the control handle 18 is in one of the three operating positions and the gears are properly meshed or in position about ready to engage one another the switch 101 can be moved to motor-energizing or "on" position since the tongue 113 will not then be restrained by the cylindrical surface 114 of the notched plate, but in any other position of the control handle 18 this cylindrical surface 114 will prevent the motor-starting switch from being operated, and the operation of the motor therefore cannot be effected unless the gear train is properly meshed or about ready for meshing engagement. It will also be apparent that when the tongue 113 is in engagement with one of the notches of the notched plate and the motor is running, the control handle 18 cannot be operated until the motor-starting switch has been moved to its "off" position and the motor de-energized. To permit the operator to known when the control lever 18 is in the exact position to permit tongue 113 of the interlock plate to be received in one of the notches 110, 111, 112 the mounting plate 82 is preferably bulged inwardly as indicated at 115 in Figs. 3 and 6, the bulge being so shaped and positioned as to be received in the notch 112 when the control lever 18 is in intermediate-speed position, and to register with notch 111 and another notch 116 located an equal angular distance away from the notch 112 on the opposite side of the plate from the notch 111. The provision of this extra notch 116 is required as the notched plate is rotated less than 120° from one positioning to another. It will be apparent that the spring 88 permits the plate to ride over the bulge 115 when the control handle 18 is operated to change-gear speeds.

It will be apparent that the particular gear-changing arrangement employed in this apparatus cooperates particularly with the interlock for the motor, since the motor interlock is effective in its operation to permit starting of the motor even though the gears 71 and 63 for example are not in mesh, but on the other hand are resting one on the other at their peripheral portions. The instant the motor is started and the gear 63 moves, the driven gear 71, or the gear 70 of the shifting frame, as the case may be, will drop into full meshing engagement, due to the weight of the frame and the action of the spring 69. The motor interlock being such that the motor can be started even when the gears are not fully in mesh provides an arrangement which is particularly desirable, in that it permits the starting of the apparatus under any conditions as long as the gears are ready to mesh properly when the motor starts.

Suitable means are provided for maintaining a proper spacing of the shaft 72 from the shaft 64 when the gears 70 or 71 are engaged with the gears 68 or 63 to provide for suitable operating backlash of the gears. For this purpose a stop plate 120 is mounted on the housing 13 inside the latter in position to be engaged by a tongue 121 extending from the lower end of the frame 73. The stop plate 120 has surfaces suitably offset and spaced apart so that the tongue 121 may engage with these surfaces at low-speed, intermediate-speed, and high-speed adjustments respectively. The stop plate 120 is provided with a depending side 125 which is slotted at 126 to receive a fastening screw 127 threaded into a wall of the housing 13, so that the plate 120 is frictionally held loosely to the housing and guided for adjusting movements. The stop plate is provided with an end portion 128 which is guided in a slot 129 provided in a part 130 of the housing 13. The end 131 of this part of the stop plate engages a conical end 132 of an adjusting screw 133, which is threaded in the boss 134 of the lower wall of the housing 13 so that the adjusting member 133 is accessible from the bottom of this housing. A lock screw 187 preferably is threaded into the boss 134 to jam against the bottom of the adjusting screw 133 to hold the latter in adjusted position. The adjusting member 133 may be rotated after the temporary removal of the lock screw 187 to bring the stop plate to a suitable position to properly regulate the backlash of the gears. Thus the backlash of the gears is simultaneously adjusted for the three operating positions of the gears and the adjustments in the backlash may be easily effected from the exterior of the housing and during operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A motor driven mixing machine of the character described, comprising a standard, an electric motor part, a gear casing part, said motor part being mounted on said standard, and said gear casing part being rigidly attached to and supported by said motor part at the end thereof, said motor having a horizontal shaft with an extended end at the front end thereof, said gear casing being positioned at the front end of said motor in general alignment therewith and enclosing the extended end of said motor shaft, speed-reducing and speed-changing gearing including a driven shaft mounted within said gear casing in driven relationship with said extended end of the motor shaft, spaced bearings for said driven shaft positioned in said motor part and in said gear casing part respectively, and a depending shaft protruding from said gear casing and operatively connected with said gearing.

2. A motor driven mixing machine of the character described comprising a standard, an electric motor mounted on the top of said standard and having a horizontal motor shaft protruding outwardly at the front end thereof, a gear casing attached to and supported by the front end of said motor over the protruding end of said motor shaft, said gear casing generally conforming in cross-sectional size with said motor and the lower portion of said gear casing beyond the motor attaching end extending upwardly somewhat above the horizontal plane of the lower portion of said motor, a planetary head rotatably mounted in the upwardly extending part of said lower portion of said gear casing so that the planetary head is positioned substantially within the space defined by a horizontal extension of the motor casing, a depending shaft rotatably mounted in said planetary head, and speed-reducing and speed-changing mechanism confined within said gear casing and operably interconnecting said motor shaft with said planetary head and said depending shaft.

3. A motor driven mixer of the character described comprising a standard, an electric motor and a separable gear casing rigidly connected with each other to form an unbroken casing carried by said standard, said motor having an extended horizontal motor shaft at the front end thereof, said gear casing being mounted in general horizontal alignment in front of and supported by said motor and being of a cross sectional size generally commensurate with the cross sectional size of said motor, speed-reducing and speed-changing mechanism mounted within said gear casing in driven relationship with the extended motor shaft, an attachment coupling at the front end of said gear casing connected in driven relationship with said mechanism, a planetary head rotatably mounted adjacent the lower portion of said gear casing in driven relationship with said mechanism, said attachment coupling being positioned in advance of and in horizontal alignment with said motor.

4. In a food-handling machine of the class described, a standard, an electric motor supported on the top of said standard and having a horizontally arranged motor shaft, a gear casing attached to and supported from said motor at the end thereof and overhanging said standard, speed-reducing and gear-shifting mechanism within said gear casing in driven relationship with said motor shaft, said mechanism comprising a driven shaft adjacent the top of said casing and substantially above the horizontal plane of the motor shaft, a depending shaft below said driven shaft and geared thereto, said depending shaft being adapted to be connected in driving engagement with a food-handling member, and an attachment coupling at the front end of said gear casing in alignment with said driven shaft adjacent the top of said casing and driven thereby.

HERBERT L. JOHNSTON.
DAVID A. MEEKER.